US009807637B2

(12) United States Patent
Bhatia et al.

(10) Patent No.: US 9,807,637 B2
(45) Date of Patent: Oct. 31, 2017

(54) BROADCAST RANGING MESSAGES FOR WLAN RTT MEASUREMENTS

(71) Applicant: QUALCOMM Incorporated, San Diego, CA (US)

(72) Inventors: Ashok Bhatia, San Diego, CA (US); Vishal Agarwal, San Diego, CA (US); Dominic Gerard Farmer, Los Gatos, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/862,985

(22) Filed: Sep. 23, 2015

(65) Prior Publication Data

US 2017/0086086 A1   Mar. 23, 2017

(51) Int. Cl.
*H04W 64/00* (2009.01)
*H04W 24/10* (2009.01)
*H04W 72/00* (2009.01)
*H04L 12/26* (2006.01)

(52) U.S. Cl.
CPC ......... *H04W 24/10* (2013.01); *H04L 43/0864* (2013.01); *H04W 64/00* (2013.01); *H04W 72/005* (2013.01)

(58) Field of Classification Search
None
See application file for complete search history.

(56) References Cited

U.S. PATENT DOCUMENTS

| 8,259,699 B2 | 9/2012 | Sahinoglu | |
|---|---|---|---|
| 8,781,492 B2 | 7/2014 | Das et al. | |
| 2002/0118723 A1* | 8/2002 | McCrady | G01S 5/021 375/130 |
| 2010/0081454 A1* | 4/2010 | Wang | H04W 68/02 455/456.1 |

(Continued)

FOREIGN PATENT DOCUMENTS

| EP | 2733872 A1 | 5/2014 |
|---|---|---|
| WO | 2014182800 A1 | 11/2014 |

OTHER PUBLICATIONS

International Search Report and Written Opinion—PCT/US2016/052054—ISA/EPO—dated Nov. 11, 2016.

*Primary Examiner* — Chi H Pham
*Assistant Examiner* — Shick Hom
(74) *Attorney, Agent, or Firm* — MG-IP Law, P.C.

(57) ABSTRACT

In one aspect, a method performed by an access point in a wireless local area network (WLAN), includes receiving a first ranging request message from a first device and monitoring for a second ranging request message from a second device on a channel of the WLAN. The first ranging request message includes a device identifier of the first device and the second ranging request message includes a device identifier of the second device. In response to receiving the second ranging request message, the access point combines the device identifier of the first device, first timing information associated with the first ranging request message, the device identifier of the second device, and second timing information associated with the second ranging request message into a single ranging response message. The access point then broadcasts the single ranging response message on the channel of the WLAN.

30 Claims, 11 Drawing Sheets

(56) References Cited

U.S. PATENT DOCUMENTS

| | | | |
|---|---|---|---|
| 2012/0158903 A1* | 6/2012 | Falk | H04W 12/10 |
| | | | 709/217 |
| 2013/0330078 A1* | 12/2013 | Trojer | H04B 10/272 |
| | | | 398/66 |
| 2014/0233550 A1 | 8/2014 | Hansen | |
| 2014/0315578 A1 | 10/2014 | Su | |
| 2014/0335891 A1 | 11/2014 | Zhang et al. | |

* cited by examiner

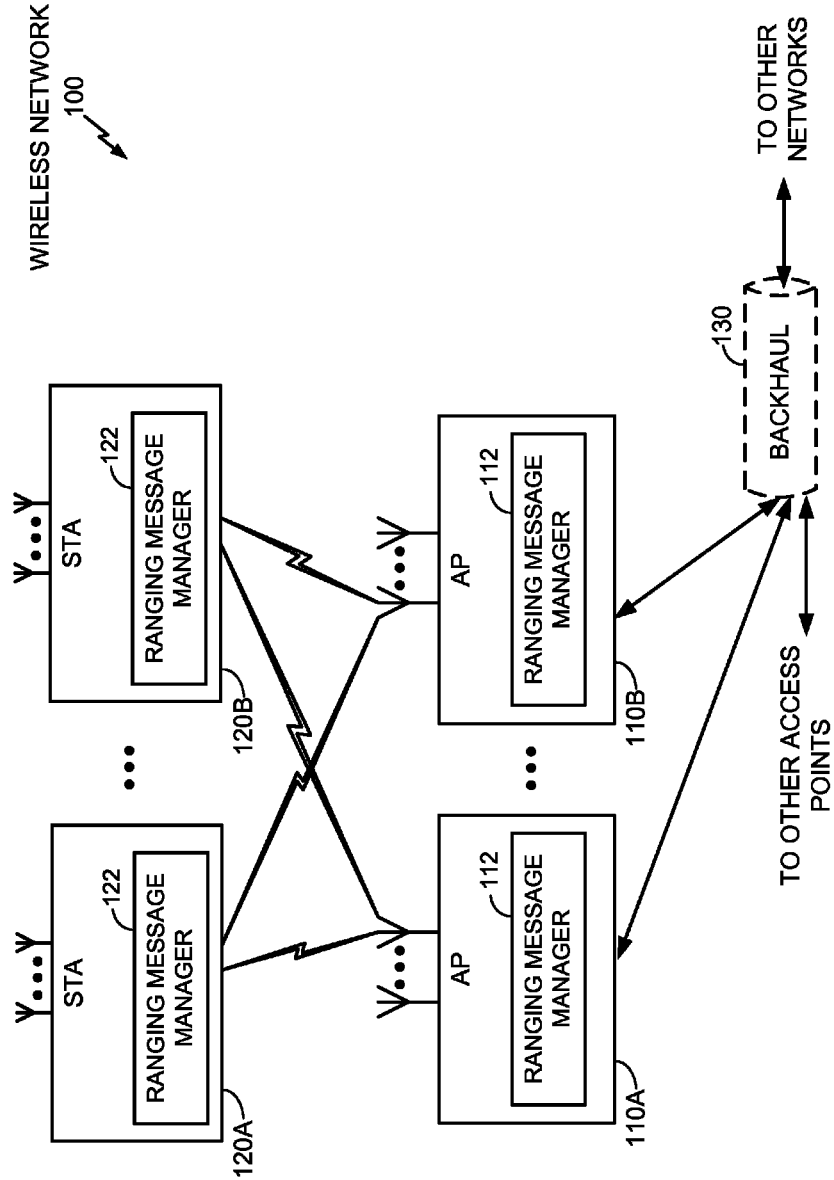

BROADCAST RANGING MESSAGES FOR WLAN RTT MEASUREMENTS

FIELD OF DISCLOSURE

Aspects of this disclosure relate generally to wireless communications, and more particularly to wireless local area network (WLAN) access point (AP) positioning and navigation systems.

BACKGROUND

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). One class of such multiple-access systems is generally referred to as wireless location area networks (WLANs), such as "Wi-Fi," and includes different members of the Institute of Electrical and Electronics Engineers (IEEE) 802.11 wireless protocol family. Generally, a Wi-Fi communication system can simultaneously support communication for multiple wireless devices, such as wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

Modern navigation systems have typically used satellite-based global positioning system (GPS) for position determination. However, the recent proliferation of WLAN (e.g., Wi-Fi) access points has made it possible for navigation systems to use these access points for position determination, especially in urban areas where there is usually large concentration of WLAN access points. WLAN navigation systems can be advantageous over GPS navigation systems because of limitations of GPS signal coverage. For example, while GPS signals may not be readily available inside a shopping mall, wireless signals generated by WLAN access points inside the shopping mall would be more readily detectable by a STA.

More specifically, for WLAN navigation systems, the locations of the WLAN access points are used as reference points from which well-known trilateration techniques can determine the location (e.g., absolute location and/or relative location) of a wireless device (e.g., a Wi-Fi-enabled cell phone, laptop, or tablet computer). The wireless device can use the round trip time (RTT) of signals transmitted to and from the access points to calculate the distances between the wireless device and the access points. Once these distances are calculated, the location of the wireless device can be estimated using trilateration techniques.

Conventional RTT techniques used to determine the distances between the wireless device and WLAN access points, are typically performed based on a peer-to-peer messaging protocol. Thus, the wireless device needs to know which APs are in proximity to the wireless device in order to exchange peer-to-peer messages in these conventional RTT techniques. For example, the wireless device typically first performs a discovery scan to determine which APs are present on each channel of the WLAN. Alternatively, some location/venue specific databases may be used to determine the APs in the proximity of the wireless device. Once the wireless device has knowledge of which APs are present and on which channels, the wireless device then exchanges messages with each known AP, performing RTT measurements, one AP at a time. However, as WLAN positioning solutions require more and more precision, the wireless device may be required to perform more frequent RTT measurements, with many access points in its vicinity. This high periodicity of discovery scans and many peer-to-peer RTT measurements can cause several problems in the WLAN. For example, current 802.11 connectivity solutions are not designed for such high periodicity solutions, because each discovery scan and RTT measurement is a disruption to the high speed data capabilities of the WLAN. In addition, the increased periodicity of discovery scans and peer-to-peer RTT measurements can adversely increase the power consumption of the wireless device. Additionally, in the scenarios where there are many mobile devices doing similar operations (for example in crowded stadiums, where many mobile devices may be concurrently trying to perform Location Based Services), the RTT Requests from many mobile devices may collide with one another, making the WLAN connectivity problems worse.

SUMMARY

Aspects of the present disclosure include a method, a device, an access point, and a computer-readable medium for assisting or otherwise performing RTT measurements in a WLAN utilizing one or more broadcast ranging messages.

For example, in one aspect, a method performed by an access point in a wireless local area network (WLAN), includes receiving a first ranging request message from a first device and monitoring for a second ranging request message from a second device on a channel of the WLAN. The first ranging request message includes a device identifier of the first device and the second ranging request message includes a device identifier of the second device. In response to receiving the second ranging request message, the access point combines the device identifier of the first device, first timing information associated with the first ranging request message, the device identifier of the second device, and second timing information associated with the second ranging request message into a single ranging response message. The access point then broadcasts the single ranging response message on the channel of the WLAN.

In another aspect, an access point for use in a wireless local area network (WLAN), includes at least one processor and at least one memory coupled to the at least one processor. The at least one processor and the at least one memory are configured to direct the access point to: (i) receive a first ranging request message from a first device on a channel of the WLAN, wherein the first ranging request message includes a device identifier of the first device; (ii) monitor the channel of the WLAN for a second ranging request message from a second device, wherein the second ranging request message includes a device identifier of the second device; (iii) in response to receiving the second ranging request message from the second device, combine the device identifier of the first device, first timing information associated with the first ranging request message, the device identifier of the second device, and second timing information associated with the second ranging request message into a single ranging response message, wherein the first and second timing information are for determining round trip time (RTT) measurements, by the first and second devices, respectively; and (iv) broadcast the single ranging response message on the channel of the WLAN.

In yet another aspect, an access point for use in a wireless local area network (WLAN) includes means for receiving, by the access point, a first ranging request message from a first device on a channel of the WLAN, wherein the first ranging request message includes a device identifier of the first device. The access point also includes means for monitoring the channel of the WLAN for a second ranging request message from a second device, wherein the second ranging request message includes a device identifier of the second device. Also included in the access point are means for combining, by the access point, the device identifier of the first device, first timing information associated with the first ranging request message, the device identifier of the second device, and second timing information associated with the second ranging request message into a single ranging response message in response to receiving the second ranging request message from the second device. The first and second timing information are for determining round trip time (RTT) measurements, by the first and second devices, respectively. The access point further includes means for broadcasting, by the access point, the single ranging response message on the channel of the WLAN.

In another aspect, a non-transitory computer-readable medium includes program code stored thereon. The program code includes instructions to direct an access point to: (i) receive a first ranging request message from a first device on a channel of the WLAN, wherein the first ranging request message includes a device identifier of the first device; (ii) monitor the channel of the WLAN for a second ranging request message from a second device, wherein the second ranging request message includes a device identifier of the second device; (iii) in response to receiving the second ranging request message, combine the device identifier of the first device, first timing information associated with the first ranging request message, the device identifier of the second device, and second timing information associated with the second ranging request message into a single ranging response message, wherein the first and second timing information are for determining round trip time (RTT) measurements, by the first and second devices, respectively; and (iv) broadcast the single ranging response message on the channel of the WLAN.

In yet another aspect, a method performed by a device in a wireless local area network (WLAN) includes transmitting, by the device, a first ranging request message on a channel of the WLAN, wherein the first ranging request message includes a device identifier of the device. The method also includes receiving, by the device, a first broadcast ranging response message broadcast on the channel by a first access point of the WLAN in response to the first ranging request message. The first broadcast ranging response message includes: the device identifier of the device, first timing information associated with the first ranging request message, a device identifier of a second device in the WLAN, and second timing information associated with a second ranging request message transmitted on the channel of the WLAN by the second device. The method also includes determining a round trip time (RTT) measurement for the first access point based on the first ranging request message and the first timing information included in the first broadcast ranging response message.

In another aspect, device for use in a wireless local area network (WLAN), includes at least one processor and at least one memory coupled to the at least one processor. The at least one processor and the at least one memory are configured to direct the device to: (i) transmit a first ranging request message on a channel of the WLAN, wherein the first ranging request message includes a device identifier of the device; (ii) receive a first broadcast ranging response message broadcast on the channel by a first access point of the WLAN in response to the first ranging request message, where the first broadcast ranging response message includes: the device identifier of the device, first timing information associated with the first ranging request message, a device identifier of a second device in the WLAN, and second timing information associated with a second ranging request message transmitted on the channel of the WLAN by the second device; and (iii) determine a round trip time (RTT) measurement for the first access point based on the first ranging request message and the first timing information included in the first broadcast ranging response message.

In yet another aspect, a device for use in a wireless local area network (WLAN) includes means for transmitting, by the device, a first ranging request message on a channel of the WLAN, wherein the first ranging request message includes a device identifier of the device. The device also includes means for receiving, by the device, a first broadcast ranging response message broadcast on the channel by a first access point of the WLAN in response to the first ranging request message. The first broadcast ranging response message includes: the device identifier of the device, first timing information associated with the first ranging request message, a device identifier of a second device in the WLAN, and second timing information associated with a second ranging request message transmitted on the channel of the WLAN by the second device. The device also includes means for determining a round trip time (RTT) measurement for the first access point based on the first ranging request message and the first timing information included in the first broadcast ranging response message.

In another aspect, a non-transitory computer-readable medium includes program code stored thereon. The program code includes instructions to direct device in a wireless local area network (WLAN) to: (i) transmit a first ranging request message on a channel of the WLAN, wherein the first ranging request message includes a device identifier of the device; (ii) receive a first broadcast ranging response message broadcast on the channel by a first access point of the WLAN in response to the first ranging request message, where the first broadcast ranging response message includes: the device identifier of the device, first timing information associated with the first ranging request message, a device identifier of a second device in the WLAN, and second timing information associated with a second ranging request message transmitted on the channel of the WLAN by the second device; and (iii) determine a round trip time (RTT) measurement for the first access point based on the first ranging request message and the first timing information included in the first broadcast ranging response message.

BRIEF DESCRIPTION OF THE DRAWINGS

The accompanying drawings are presented to aid in the description of various aspects of the disclosure and are provided solely for illustration of the aspects and not limitation thereof.

FIG. 1 illustrates an example wireless network employing a Wi-Fi protocol.

DETAILED DESCRIPTION

Figure 2A:
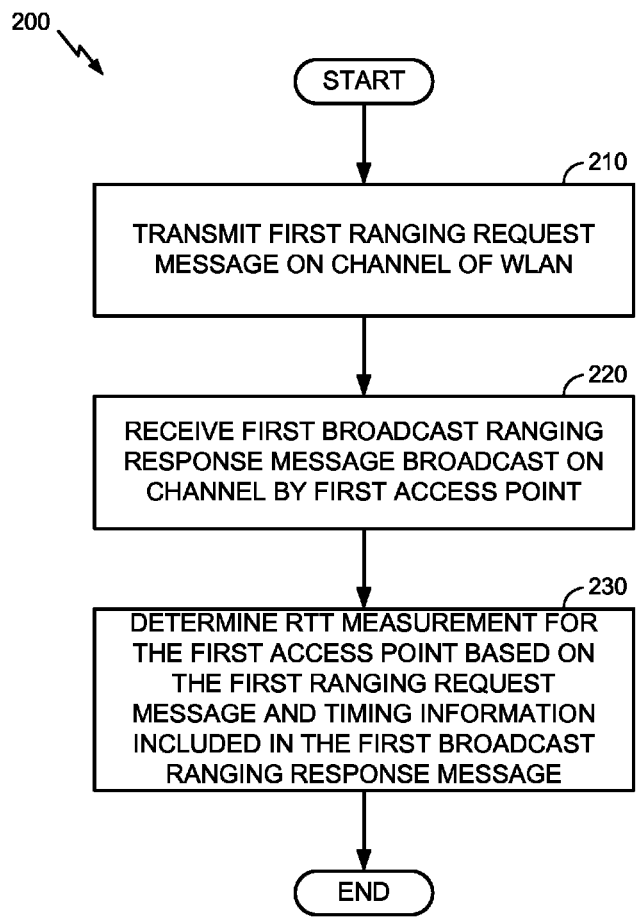
FIG. 2A is a flowchart illustrating a process of transmitting a first ranging request message in a WLAN for determining RTT measurements by a wireless device.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless network 100. As shown, the wireless network 100, which may also be referred to herein as a Basic Service Set (BSS), is formed from several wireless nodes, including one or more Access Points (APs) 110A and 110B and a plurality of subscriber stations (STAs) 120A and 120B. Each wireless node is generally capable of receiving and/or transmitting. The wireless network 100 may support any number of APs 110A and 110B distributed throughout a geographic region to provide coverage for the STAs 120A and 120B. For simplicity, only two APs 110A and 110B are shown in FIG. 1, providing coordination and control among the STAs 120A and 120B, as well as access to other APs or other networks (e.g., the Internet) via a backhaul connection 130. However, in other examples, the wireless network 100 may include many (more than two) APs, including several APs operating on the same WLAN channel and several other APs operating on different WLAN channels.

The APs 110A and 110B are generally fixed entities that provide backhaul services to the STAs 120A and 120B in their geographic region of coverage. However, the APs 110A and 110B may be mobile in some applications (e.g., a mobile device serving as a wireless hotspot for other devices). The STAs 120A and 120B may be fixed or mobile. Examples of STAs 120A and 120B include a telephone (e.g., cellular telephone), a laptop computer, a desktop computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices. In general, these networking protocols may be referred to as "Wi-Fi," including any member of the Institute of Electrical and Electronics Engineers (IEEE) 802.11 wireless protocol family.

As discussed above, conventional discovery scan and peer-to-peer RTT measurements may disrupt high speed data capabilities of the WLAN as well as adversely impact the power consumption of the wireless device. Accordingly, the different entities shown in FIG. 1 may be variously configured in accordance with the teachings herein to provide or otherwise support the broadcasting of ranging messages in wireless network 100 for determining RTT measurements. In some aspects, the broadcasting of ranging messages provides for a reduction in the timeline associated with performing RTT measurements on each Wi-Fi channel. Thus, as shown in FIG. 1, the STA 120A may include a ranging message manager 122 for broadcasting a ranging request message to all APs on a channel of the WLAN, while AP 110A may include a ranging message manager 112 that monitors the channel for such broadcast ranging request messages. These and other aspects will be described in more detail below.

FIG. 2A is a flowchart illustrating a process 200 of transmitting a first ranging request message in a WLAN for determining RTT measurements by a wireless device. Process 200 is one possible process performed by a wireless device (e.g., the STA 120A under direction of ranging message manager 122). In process block 210, STA 120A transmits a first ranging request message (e.g., a probe) on a channel of the WLAN (e.g., wireless network 100). The first ranging request message transmitted by STA 120A may include a device identifier of the wireless device, such as a media access control (MAC) address of STA 120A.

Figure 2B:
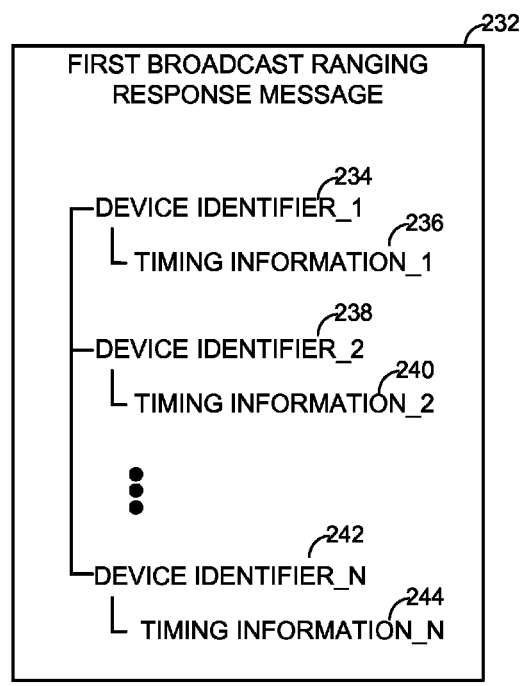
FIG. 2B is a diagram illustrating an example first broadcast ranging response message.

In one embodiment, the STA 120A broadcasts the first ranging request message on the channel of the WLAN without a priori knowledge of which of the APs (110A or 110B) are available on the first channel of the WLAN. That is, the STA 120A may broadcast the first ranging request message without the need to know the MAC address of any APs (e.g., AP 110A and AP 110B). As will be discussed below with reference to FIGS. 4 and 5, one or more APs operating on this channel of the WLAN may receive the transmitted ranging request message and generate a ranging response message (e.g., a beacon) in response thereto. Thus, in process block 220, STA 120A receives a first broadcast ranging response message that is sent by a first AP (e.g., AP 110A) of the WLAN (e.g. wireless network 100). In one aspect the first broadcast ranging response message is generated by the AP 110A in response to several ranging request messages transmitted on the channel of the WLAN by several wireless devices. For example, both STA 120A and STA 120B may each generate and transmit a ranging request message to AP 110A. In response to receiving multiple ranging request messages, the AP 110A may combine relevant timing information associated with each of the received ranging request messages into a single broadcast ranging response message that is broadcast back to STA 120A and STA 120B on the channel of the WLAN. For example, FIG. 2B is a diagram illustrating a first broadcast ranging response message 232. The illustrated example of the first broadcast ranging response message 232 includes a device identifier 234 of a first device (e.g., STA 120A), timing information associated with a first ranging request message transmitted on the channel by the first device, a device identifier 238 of a second device (e.g., STA 120B), and timing information associated with a second ranging request message transmitted on the channel by the second device. The first broadcast ranging response message 232 may include further device identifiers 242 and corresponding timing information 244 for each of a plurality of ranging request messages received at the AP 110A. In one aspect, the device identifiers 234 and 238 are the MAC addresses of the corresponding wireless devices (e.g., STA 120A and STA 120B) that transmitted a ranging request message to AP 110A. Furthermore, the timing information 236 and 240 may include a time-stamp indicating a time that the respective ranging request message was received at the AP 110A.

Returning now back to FIG. 2A, process 200 next includes process block 230, where STA 120A determines a round trip time (RTT) measurement for the first access point (e.g., AP 110A) based on the first ranging request message (e.g., a time that the first ranging request message was transmitted on the channel of the WLAN by STA 120A) and the timing information (e.g., timing information 236) included in the first broadcast ranging response message 232. As mentioned above, the first broadcast ranging response message 232 includes several device identifiers and associated timing information. Thus, the STA 120A may retrieve the relevant timing information from the first broadcast ranging response message 232 based on the known device identifier (e.g., MAC address) of the STA 120A. That is, STA 120A may be configured to extract, from the first broadcast ranging response message 232, timing information related to only the ranging request message broadcast by STA 120A, itself, based on the MAC address of STA 120A.

As will be discussed in more detail with reference to process 300 of FIG. 3, the illustrated process blocks 210, 220, and 230, of broadcasting, monitoring, and determining, respectively, may be repeated by STA 120A for each of a plurality of channels included in the WLAN.

Figure 3:
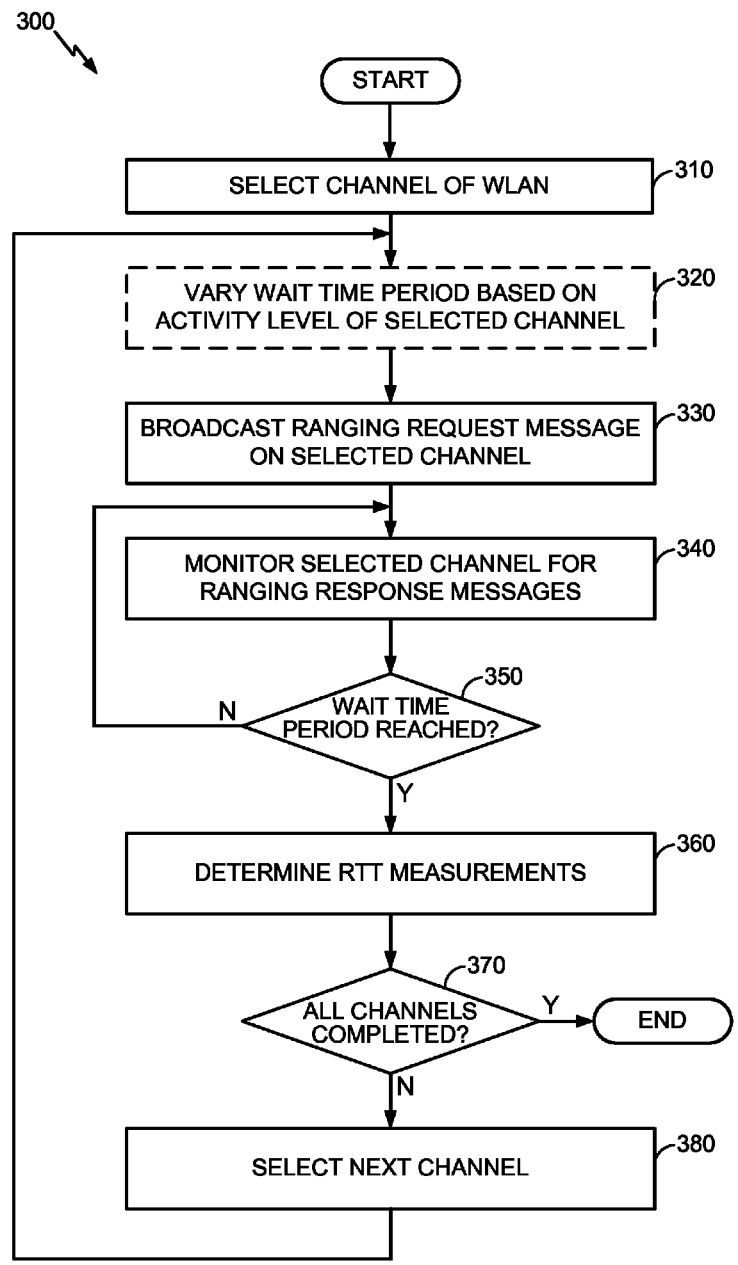
FIG. 3 is a flowchart illustrating a process of broadcasting ranging request messages in a WLAN for determining RTT measurements by a wireless device.

FIG. 3 is a flowchart illustrating a process 300 of broadcasting ranging request messages in a WLAN for determining RTT measurements by a wireless device. Process 300 is one possible process performed by a wireless device (e.g., the STA 120A under direction of ranging message manager 122). In process block 310, STA 120A selects a channel of the WLAN. As discussed above, once the STA 120A broadcasts a ranging request message, the STA 120A then monitors the respective channel for ranging response messages. In one embodiment, the STA 120A monitors the channel for a wait time period. In one aspect, the wait time period provides a time period to allow for multiple APs to respond to the ranging request message since different APs may have differing delays and/or congestion issues. Furthermore, APs may randomize the time at which they broadcast their ranging response messages so as to avoid collisions with one another. Thus, the wait time period may further allow for these broadcast ranging response messages to be spread out over time. In one embodiment, the wait time period utilized by STA 120A is fixed. In another embodiment, the wait time period is variable. Thus, process 300 includes optional process block 320 of varying the wait time period based, in part, on an activity level of the selected channel. In dense AP environments (e.g., WLANs with many APs operating on the same channel), the activity level of a selected channel may be high and thus, the response time of one or more of the APs may be slow. Accordingly, process block 320 may include determining the activity level of the selected channel and comparing the activity level with one or more activity level thresholds to vary the wait time period. In one aspect, process block 320 includes increasing the wait time period if the activity level of the selected channel is above or exceeds an activity level threshold indicating a higher level of activity on the selected channel. Increasing the wait time period for active channels may ensure that each AP is given enough time to generate and broadcast a ranging response message. Similarly, decreasing the wait time period of less active channels may allow the STA 120A to complete the RTT measurements quicker with less wasted time.

Continuing now with process 300, with the wait time period set, next in process block 330, STA 120A broadcasts the ranging request message on the selected channel. In process block 340, STA 120A monitors the selected channel for broadcast ranging response messages. As discussed above, the ranging request message is a broadcast message sent to every AP operating on the selected channel. Thus, monitoring the selected channel may include receiving multiple broadcast ranging response messages. For example, STA 120A may receive a first broadcast ranging response message 232 on the selected channel from AP 110A and may also receive another first broadcast ranging response message 232 on the selected channel from AP 110B.

Next, in decision block 350, STA 120A determines whether the end of the wait time period has been reached. If not, process 300 returns to process block 340 where STA 120A continues to monitor the selected channel for further broadcast ranging response messages. If, in decision block 350, it is determined that the end of the wait time period has been reached, then process 300 proceeds to process block 360 where STA 120A determines the RTT measurements based on the received broadcast ranging response messages. For example, the STA 120A may determine a first RTT measurement based on a first ranging response message 232 received from AP 110A and may also determine a second RTT measurement based on a first ranging response message 232 received from AP 110B. The first RTT measurement may be representative of a distance between STA 120A and AP 110A, while the second RTT measurement may be representative of a distance between STA 120A and AP 110B.

In decision block 370, STA 120A determines whether RTT measurements have been completed for all channels of the WLAN. If so, process 300 ends. If not, process block 380 selects a next channel of the WLAN and process 300 returns to process block 320.

Figure 4:
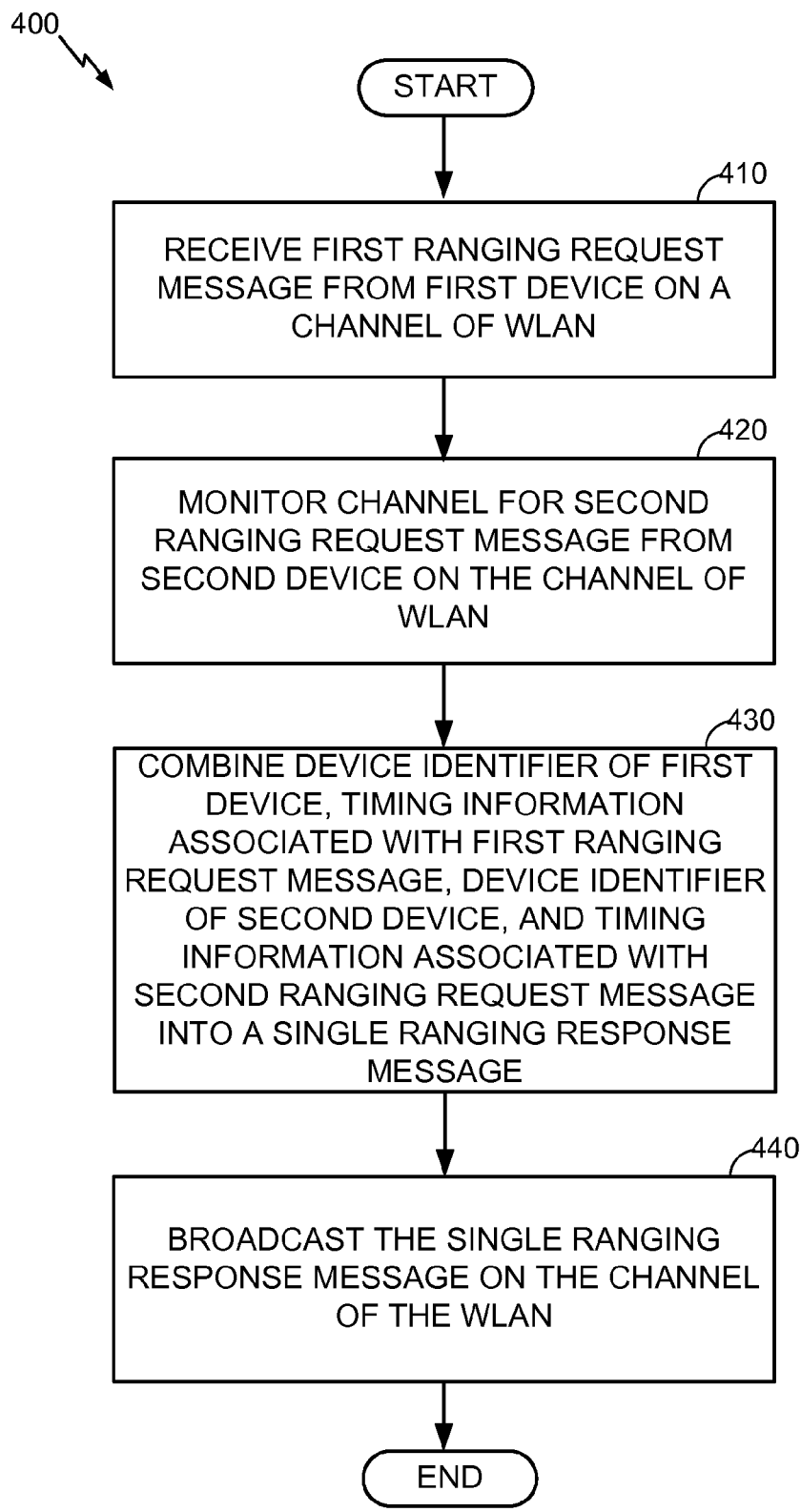
FIG. 4 is a flowchart illustrating a process of receiving first and second ranging request messages at an access point of a WLAN.

FIG. 4 is a flowchart illustrating a process 400 of receiving first and second ranging request messages at an access point of a WLAN. Process 400 is one possible process performed by a base station (e.g., the AP 110A and/or AP 110B under direction of ranging message manager 112). In a process block 410, AP 110A receives a first ranging request message from a first device (e.g., STA 120A) on a channel of the WLAN, where the first ranging request message includes a device identifier (e.g., MAC address) of the first device. In a process block 420, AP 110A monitors the channel of the WLAN for a second ranging request message from a second device (e.g., STA 120B), where the second ranging request message includes a device identifier (e.g., MAC address) of the second device.

Next, in process block 430, in response to receiving the second ranging request message from the second device, the AP 110A combines the device identifier of the first device, first timing information associated with the first ranging request message, the device identifier of the second device, and second timing information associated with the second ranging request message into a single broadcast ranging response message, such as broadcast ranging response message 232 of FIG. 2B. As discussed above, the timing information may be time stamps corresponding to when the respective ranging request messages were received at AP 110A and the device identifiers may be the MAC addresses of the respective first and second devices (e.g., STA 120A and STA 120B). The AP 110A then broadcasts the single ranging response message on the channel of the WLAN (i.e., process block 440). In one aspect, the AP 110A may receive a ranging request message from only one device (e.g., STA 120A) of the WLAN. That is, the AP 110A may not receive any additional ranging request messages other than the first ranging request message received from the first device (e.g., STA 120A). Thus, in this example, the single ranging response message broadcast in process block 440 may include the device identifier only of the first device and timing information associated only with the ranging request message received from the first device.

Figure 5:
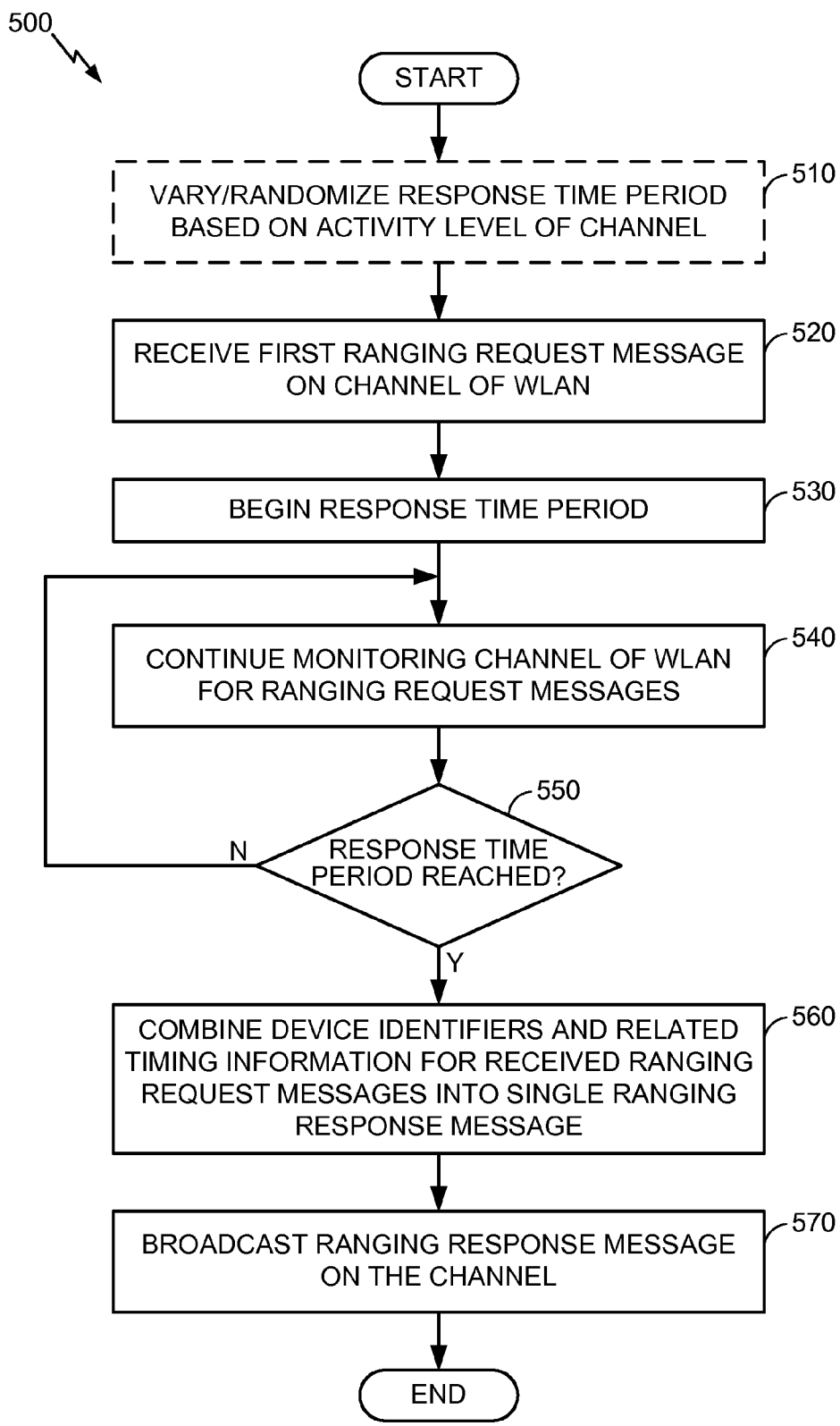
FIG. 5 is a flowchart illustrating a process of broadcasting a ranging response message on a channel of a WLAN.

FIG. 5 is a flowchart illustrating a process 500 of broadcasting a ranging response message by an access point of a WLAN. Process 500 is one possible process performed by a base station (e.g., the AP 110A and/or AP 110B under direction of ranging message manager 112). In one embodiment, an AP may include a response time period that represents an amount of time that the AP may wait upon receiving a ranging request message before sending a corresponding ranging response message. The response time period may allow the AP to respond to multiple ranging request messages received from multiple mobile devices, by broadcasting a combined single ranging response message (e.g., broadcast ranging response message 232) in response to all of the ranging request messages received during the response time period. In one embodiment, the response time period is fixed. However, as discussed above, different channels of the WLAN may experience different levels of activity due to traffic, differing delays and/or congestion issues. Thus, in another embodiment, the response time period is variable, where process 500 includes optional process block 510 of varying and/or randomizing the response time period based, in part, on a determined activity level of the channel. In one aspect, the AP 110A and/or AP 110B may increase the response time period in response to the activity level of the first channel being above a first activity threshold that indicates a higher level of activity on the first channel. Similarly, AP 110A and/or AP 110B may decrease the response time period for channels that are experiencing a lower level of activity (e.g., less traffic). Process block 510 may also include randomizing the response time period so as to reduce interference with other ranging response messages broadcast by other access points in the WLAN. For example, AP 110A, through randomization, may vary the response time period by a first amount, where AP 110B, again through randomization, may vary its response time period by a second amount, such that the ranging response message broadcast by AP 110A occurs at a different time than the broadcasting of a ranging response message by AP 110B.

With the response time period set in process block 510, process 500 begins monitoring a channel of the WLAN for ranging request messages, where in process block 520 a first ranging response message is received at the AP on the first channel. Once the first ranging response message is received at the AP (e.g., AP 110A and/or AP 110B), process block 530 begins the response time period. Next, in process block 540 and decision block 550, the AP continues monitoring the first channel of the WLAN for additional ranging request messages until the end of the response time period is reached.

In one embodiment, the ranging request messages received at the AP, each include a MAC address of the wireless device that broadcast the ranging request message. Process block 560 thus includes combining these MAC addresses and related timing information for the receiving ranging request messages into a single ranging response message. In one embodiment, the ranging response message includes, for each ranging request message received, (1) the MAC address of the device that broadcast the ranging request message, (2) a first time-stamp indicating a time that the ranging request message was received at the AP, and (3) a second time-stamp indicating a time that the AP is sending the ranging response message. Including the second time-stamp in the ranging response message may allow the wireless device to compensate or otherwise account for the delay associated with the response time period utilized at the AP. As will be discussed in more detail below, rather than include the second time-stamp in the ranging response message, the AP may optionally generate and transmit a second ranging response message that includes the second time-stamp indicating the time that the first ranging response message was broadcast on the channel of the WLAN.

Next, in process block 570, the AP 110A and/or AP 110B broadcasts the ranging response message on the first channel. In one aspect, the AP 110A may receive a ranging request message from only one device (e.g., STA 120A) of the WLAN during the response time period. Thus, in this example, the single ranging response message broadcast in process block 570 may include the device identifier only of the first device and timing information associated only with the ranging request message received from the first device in process block 520.

Figure 6:
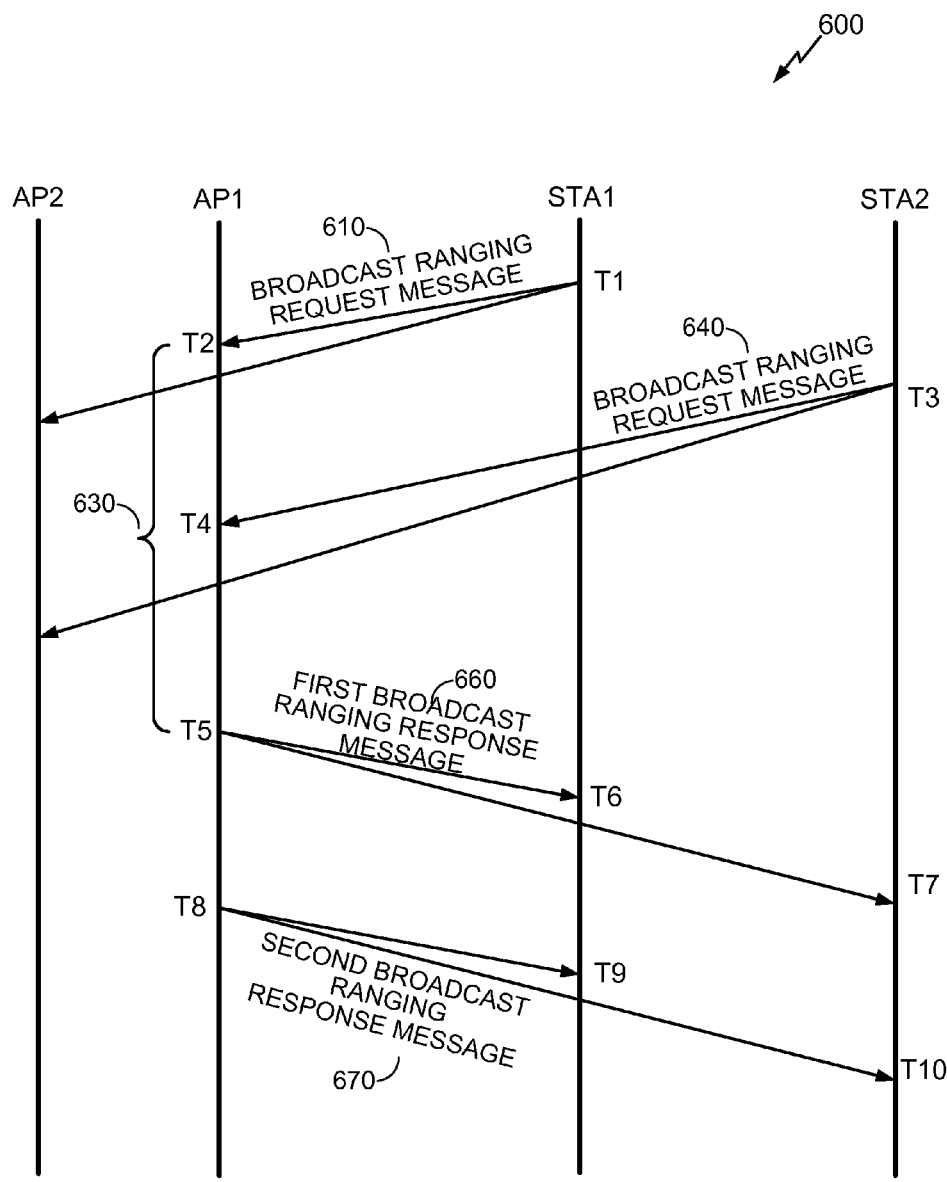
FIG. 6 is a call flow procedure illustrating the broadcasting of ranging messages in a WLAN.

FIG. 6 is a call flow procedure 600 illustrating the broadcasting of ranging messages in a WLAN. At time T1, the STA1 broadcasts a first ranging request message 610. In one embodiment, the broadcast ranging request message 610 is sent using a non-HT duplicate PPDU so as to have the widest bandwidth. At time T2, the AP1 receives the first ranging request message 610 and in response thereto, initiates the beginning of a response time period 630 at time T2. During the response time period 630, STA2 also broadcasts a ranging request message (i.e., second ranging request message 640), but at time T3. The second broadcast ranging request message 640 is received at the AP1 at time T4. The AP1 then continues to monitor the channel for additional ranging request messages until the expiration of the response time period 630 at time T5. At time T5, the AP1 broadcasts the first broadcast ranging response message 660. The broadcast ranging response message 660 includes the MAC address of STA1, an indication of time T2 (i.e., time that AP1 received the first ranging request message 610), the MAC address of STA2, and an indication of time T4 (i.e., the time that AP1 received the second ranging request message 640). The broadcast ranging response message 660 may also include a Neighbor Report. In one embodiment, the first broadcast ranging response message 660 contains all the necessary information for STA1 and STA2 to do RTT. The illustrated example of FIG. 6 shows the first broadcast ranging response message 660 being received by STA1 at time T6 and by STA2 at time T7.

At time T8, a second broadcast ranging response message 670 is broadcast by the AP1. The second broadcast ranging response message 660 includes an indication (e.g., time stamp) of time T5 (i.e., the time that the first broadcast ranging response message 660 was sent by the AP1). At time T9, the STA1 receives the second broadcast ranging response message 670 and can then begin determining the RTT measurements. At time T10, the STA2 receives the same second broadcast ranging response message 670 and can begin determining its own RTT measurements. Note that if the second broadcast ranging response message 670 is not received by either STA1 or STA2, another Broadcast Ranging Request Message could be sent by either STA to indicate that the second broadcast ranging response message 670 should be retransmitted by the AP1.

FIG. 6 further illustrates a second access point AP2 that receives the broadcast ranging request messages 610 and 640. The second access point AP2 is configured similarly to AP1 and may include initiating its own response time period 630 in response to receiving broadcast ranging request message 610, and may also generate its own first and second broadcast ranging response messages 660 and/or 670, similar to that described above with reference AP1.

In one embodiment of a wireless device in accordance with the teachings herein, the access point includes a Wi-Fi stack and LTE stack that are integrated on a single processor. However, in other embodiments, a wireless device in accordance with the teachings herein may include a Wi-Fi stack integrated into a single processor along with any other protocol stack that has periodic activity, such as WCDMA and CDMA.

Figure 7:
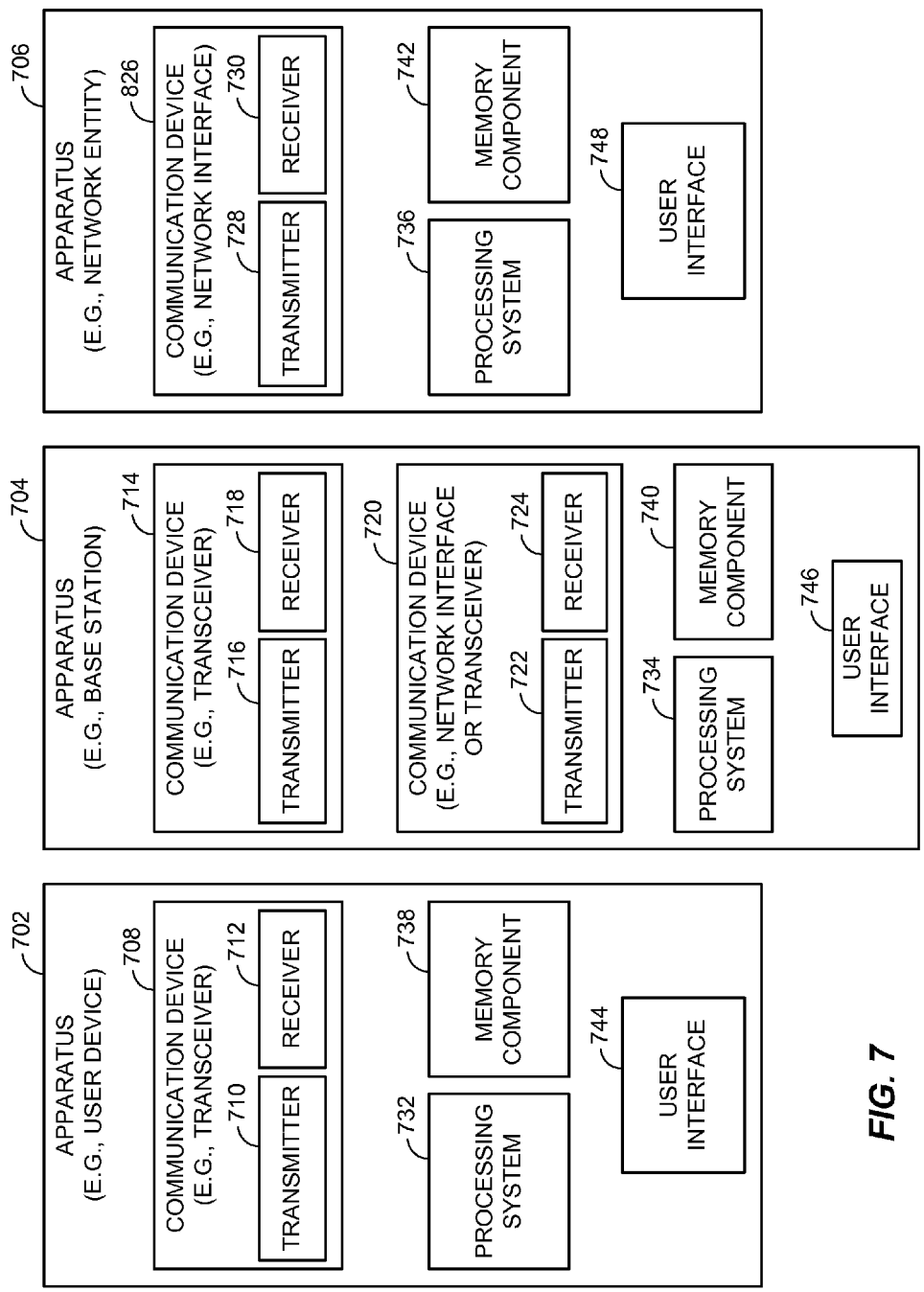
FIG. 7 is a simplified block diagram of several sample aspects of components that may be employed in an apparatus and configured to support communication as taught herein.

FIG. 7 illustrates several sample components (represented by corresponding blocks) that may be incorporated into an apparatus 702, an apparatus 704, and an apparatus 706 (corresponding to, for example, a user device, a base station, and a network entity, respectively) to support the broadcast ranging message operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay)) for communicating with other nodes via at least one designated radio access technology (RAT). Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay station, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 704 may also comprise a Network Listen Module (NLM) or the like for performing various measurements.

The apparatus 706 (and the apparatus 704 if it is not a relay station) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 7, the communication device 726 is shown as comprising a transmitter 728 and a receiver 730. Similarly, if the apparatus 704 is not a relay station, the communication device 720 may comprise a network interface that is configured to communicate with one or more network entities via a wire-based or wireless backhaul. As with the communication device 726, the communication device 8720 is shown as comprising a transmitter 722 and a receiver 724.

The apparatuses 702, 704, and 706 also include other components that may be used in conjunction with the broadcast ranging message operations as taught herein. The apparatus 702 includes a processing system 732 for providing functionality relating to, for example, the broadcasting of a ranging request message, the monitoring of a channel of the WLAN for ranging response messages, and the determining of RTT measurements, as taught herein and for providing other processing functionality. The apparatus 704 includes a processing system 734 for providing functionality relating to, for example, the monitoring of a channel of the WLAN for ranging request messages, combining device identifiers and corresponding timing information into a single ranging request message, and the broadcasting of the single ranging response message, as taught herein and for providing other processing functionality. The apparatus 706 includes a processing system 736 for providing functionality relating to, for example, optionally aiding apparatus 702 in the determining of the RTT measurements and for providing other processing functionality. The apparatuses 702, 704, and 706 include memory components 738, 740, and 742 (e.g., each including a memory device), respectively, for maintaining information (e.g., information indicative of reserved resources, thresholds, parameters, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatuses 702, 704, and/or 706 are shown in FIG. 7 as including various components that may be configured according to the various examples described herein. It will be appreciated, however, that the illustrated blocks may have different functionality in different designs.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

Figure 8:
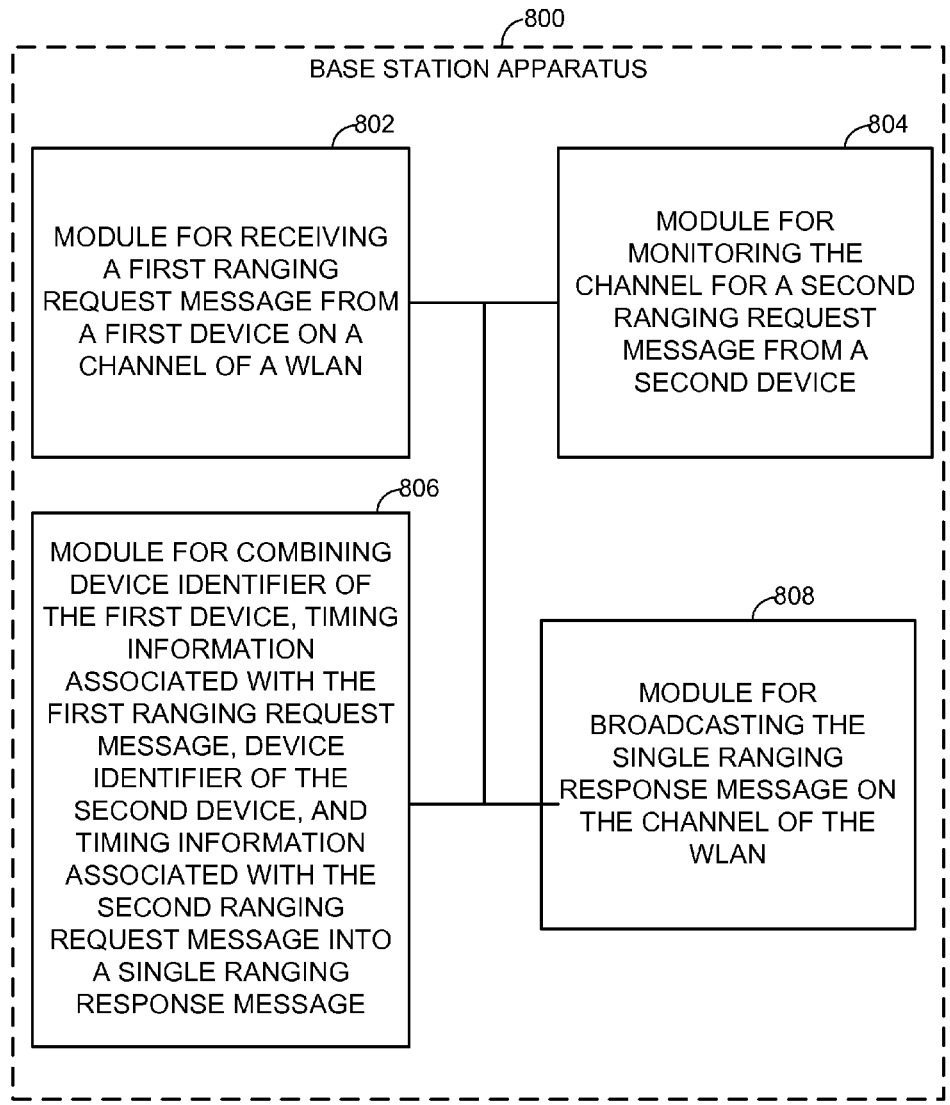
FIGS. 8 and 9 are other simplified block diagrams of several sample aspects of apparatuses configured to support communication as taught herein.

FIG. 8 illustrates an example base station apparatus 800 represented as a series of interrelated functional modules. Base station apparatus 800 is one possible implementation of AP 110A, AP 110B, and/or apparatus 704. A module for receiving a first ranging request message from a first device on a channel of a WLAN 802 may correspond at least in some aspects to, for example, a communication device 714, as discussed herein. A module for monitoring the channel of the WLAN for a second ranging request message from a second device 804 may correspond at least in some aspects to, for example, a communication device 714, as discussed herein. A module for combining the device identifier of the first device, timing information associated with the first ranging request message, the device identifier of the second device, and timing information associated with the second ranging request into a single ranging response message 806 may correspond, at least in some aspect to, for example, processing system 734 and/or memory component 740. A module for broadcasting the single ranging response message on the channel of the WLAN 808 may correspond at least in some aspects to, for example, communication device 714, as discussed herein.

Figure 9:
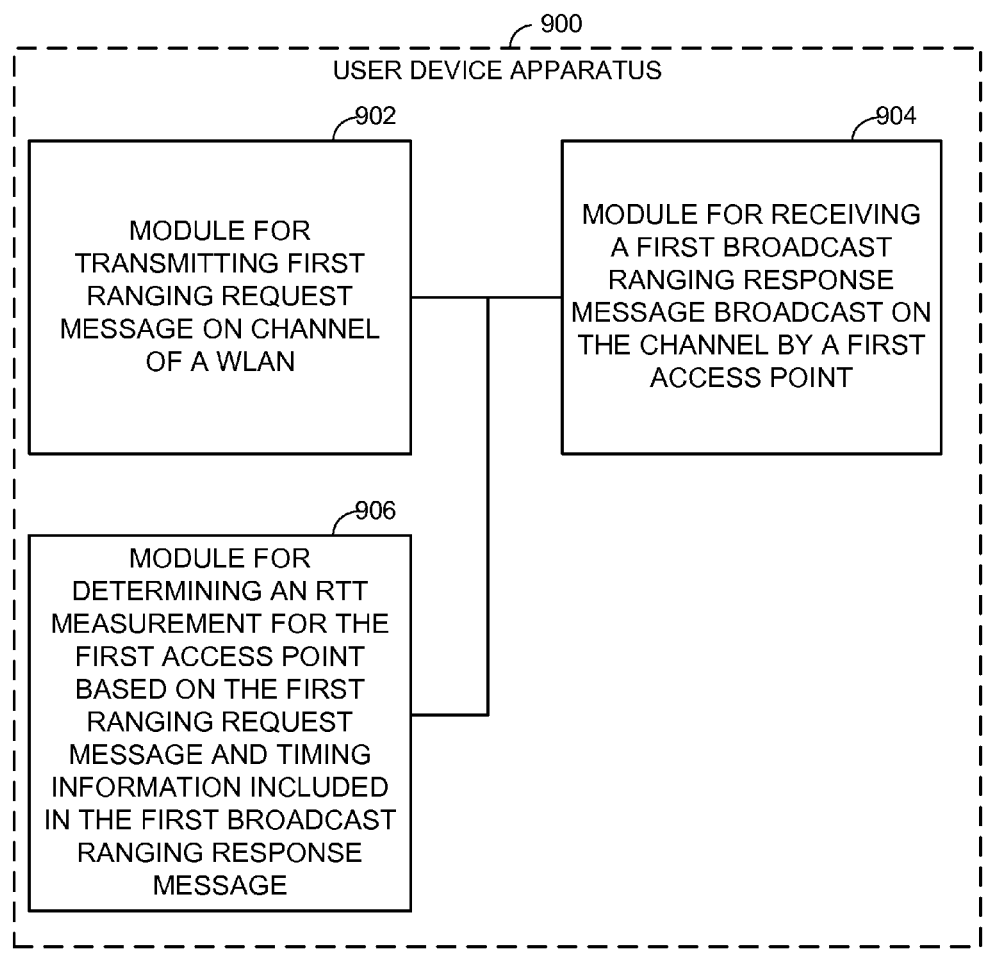

FIG. 9 illustrates an example user device apparatus 900 represented as a series of interrelated functional modules. User device apparatus 900 is one possible implementation of STA 120A, STA 120B, and/or apparatus 702. A module for transmitting a first ranging request message on a channel of a WLAN 902 may correspond at least in some aspects to, for example, a communication device 708, as discussed herein. A module for receiving a first broadcast ranging response message broadcast on the channel by an access point 904 may correspond at least in some aspects to, for example, a communication device 708, as discussed herein. A module for determining an RTT measurement for each access point based on the ranging request message and timing information included in the first broadcast ranging response message 906 may correspond at least in some aspects to, for example, a processing system 732 and/or memory component 738, as discussed herein.

The functionality of the modules of FIGS. 8 and 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 8 and 9, as well as other components and functions described herein, may be implemented using any suitable means. Such means also may be implemented, at least in part, using corresponding structure as taught herein. For example, the components described above in conjunction with the "module for" components of FIGS. 8 and 9 also may correspond to similarly designated "means for" functionality. Thus, in some aspects one or more of such means may be implemented using one or more of processor components, integrated circuits, or other suitable structure as taught herein.

Figure 10:
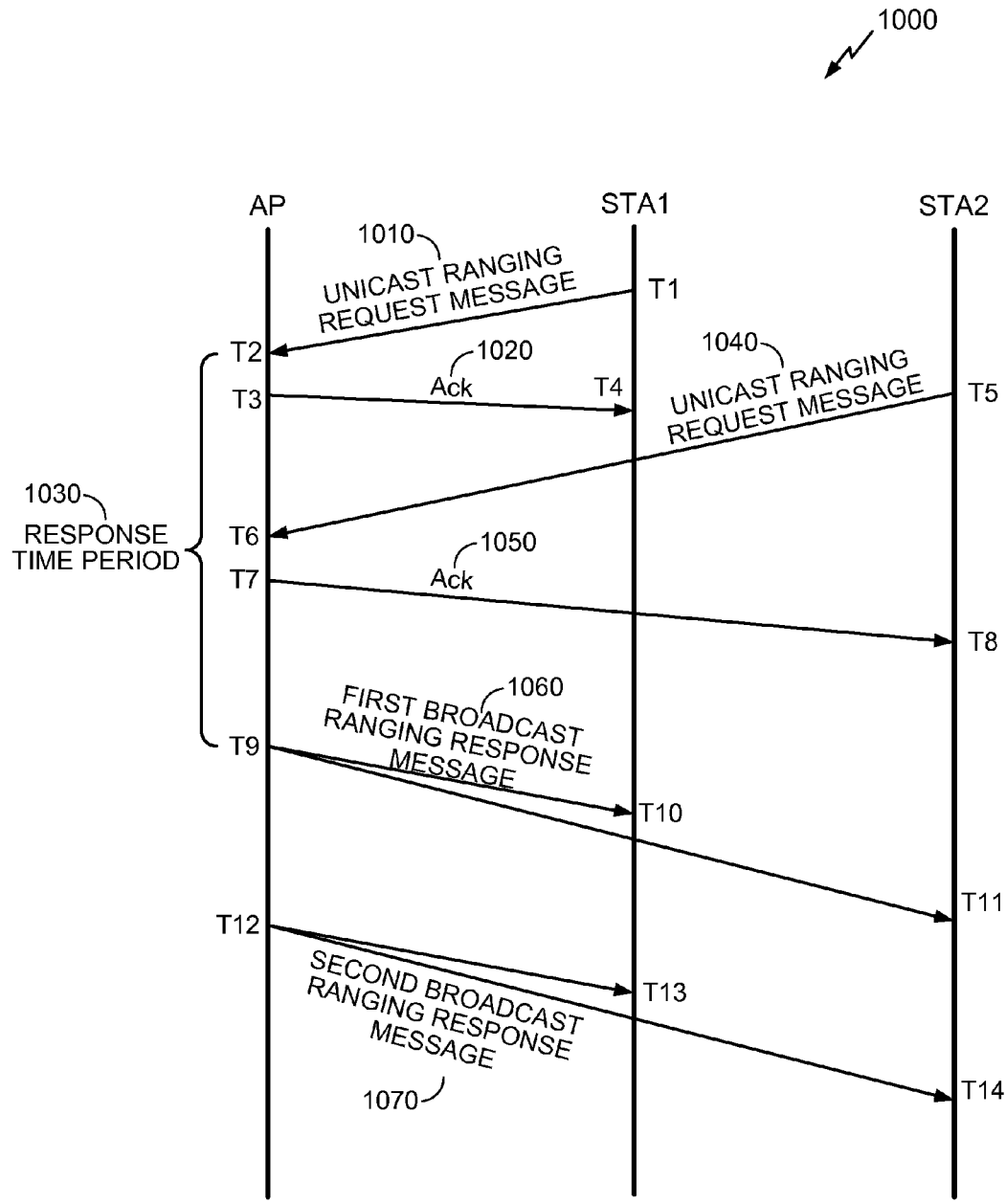
FIG. 10 is a call flow procedure illustrating the unicasting of ranging request messages in a WLAN.

FIG. 10 is a call flow procedure illustrating the unicasting of ranging request messages in a WLAN incorporating the use of dialog tokens, as well as follow-up dialog tokens. At time T1, having completed a discovery of available APs, the STA1 unicasts a first ranging request message 1010 that includes a non-zero Dialog Token DT1. In one embodiment, the unicast ranging request message 1010 is sent using a non-HT duplicate PPDU so as to have the widest bandwidth. At time T2, the AP receives the first ranging request message 1010 and in response thereto, sends an acknowledgement (Ack) message 1020 at time T3. Thus, the response time period 1030 begins at time T2. The STA1 receives the Ack message 1020 at time T4. If, however, the Ack 1020 is not received by STA1, the STA1 may send a new ranging request message with a dialog token DT1=DT1+1. During the response time period 1030, STA2 also unicasts a ranging request message (i.e., second ranging request message 1040), but at time T5, with a non-zero Dialog Token DT2 that is independent of the Dialog Token chosen by STA1. The second unicast ranging request message 1040 is received at the AP at time T6 and an Ack message 1050 is sent by the AP at time T7. The Ack message 1050 is received by the STA2 at time T8. If, however, the Ack message 1050 is not received by STA2, the STA2 shall send a new broadcast ranging request message with DT2=DT2+1. In one embodiment, the Ack message 1020 and the Ack message 1050 are not broadcast messages, and are instead unicast messages. The AP then continues to monitor the channel for additional ranging request messages until the expiration of the response time period 1030 at time T9. At time T9, the AP broadcasts a first broadcast ranging response message 1060. The first broadcast ranging response message 1060 includes the MAC address of STA1, the Dialog Token DT1, an indication of time T2 (i.e., time that AP received the first ranging request message 1010), an indication of T3 (i.e., time that AP sent the first Ack message 1020), the MAC address of STA2, the Dialog Token DT2, and an indication of time T6 (i.e., the time that AP received the second ranging request message 1040), and an indication of time T7 (i.e., the time that the AP sent the second Ack message 1050). The first broadcast ranging response message 1060 may also include a Neighbor Report, a Dialog Token DT3 and a Follow Up Dialog Token set to 0 (to indicate it is the initial one). In one embodiment, the first broadcast ranging response message 1060 contains all the necessary information for STA1 and STA2 to do RTT. In an alternative embodiment, the first broadcast ranging response message 1060 could include a difference between time T3 and time T2 (e.g., T3-T2) as well as a difference between time T7 and time T6 (e.g., T7-T6) so as to save bits. At time T12, a second broadcast ranging response message 1070 is broadcast that includes a Dialog Token set to DT3+1, a Follow Up Dialog Token set to DT3, as well as an indication of time T9 (i.e., the time that the first broadcast ranging response message 1060 was sent by the AP). At time T13, the STA1 receives the second broadcast ranging response message 1070 and can then begin determining the RTT measurements. At time T14, the STA2 receives the same second broadcast ranging response message 1070 and can begin determining its own RTT measurements. Note that if either the first broadcast ranging response message 1060 or the second broadcast ranging response message 1070 is not received by either STA1 or STA2, another unicast Ranging Request Message with Dialog Token set to 0 could be sent by either STA to indicate that the respective broadcast ranging response message should be retransmitted by the AP. A ranging response message retransmission PPDU shall have the same Dialog Token and Follow Up Dialog Token as included in ranging response message 1060, but a new MAC sequence number. Another option is for either STA to restart the process by sending a unicast Ranging Request Message to the AP. Note that this mechanism has improved the medium usage for RTT by a factor of $(6N)/(2N+1)\sim 3$, where N is the number of STAs that each AP does ranging with.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for broadcasting ranging messages (i.e., ranging request messages and/or ranging response messages), as discussed above with reference to FIGS. 2A-5.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by an access point of a wireless local area network (WLAN), the method comprising:
   receiving, by the access point, a first ranging request message from a first device on a channel of the WLAN, wherein the first ranging request message includes a device identifier of the first device;
   monitoring, by the access point, the channel of the WLAN for a second ranging request message from a second device, wherein the second ranging request message includes a device identifier of the second device;
   in response to receiving the second ranging request message from the second device during a response time period, combining, by the access point, the device identifier of the first device, first timing information associated with the first ranging request message, the device identifier of the second device, and second timing information associated with the second ranging request message into a single ranging response message, wherein the first and second timing information are for determining round trip time (RTT) measurements, by the first and second devices, respectively; and in response to an end of the response time period, broadcasting, by the access point, the single ranging response message on the channel of the WLAN.

2. The method of claim 1, further comprising:
beginning the response time period in response to receiving the first ranging request message.

3. The method of claim 2, wherein monitoring the channel of the WLAN for the second ranging request message from the second device comprises monitoring the channel until the end of the response time period, the method further comprising:
in response to not receiving any additional ranging request messages, including the second ranging request message, generating the single ranging response message to include the device identifier only of the first device and the first timing information associated only with the first ranging request message.

4. The method of claim 2, wherein the first ranging request message and the second ranging request message are broadcast ranging request messages broadcast on the channel of the WLAN by the first and second devices, respectively, the method further comprising randomizing the response time period to reduce interference with other ranging response messages broadcast by other access points in the WLAN.

5. The method of claim 2, wherein the response time period is fixed.

6. The method of claim 2, wherein the response time period is variable, the method further comprising varying the response time period based on an activity level of the channel of the WLAN.

7. The method of claim 6, wherein varying the response time period comprises increasing the response time period in response to the activity level of the channel being above an activity level threshold indicating a higher level of activity on the channel.

8. The method of claim 1, wherein the first timing information comprises a time stamp indicating a time that the first ranging request message was received at the access point and wherein the second timing information comprises a time stamp indicating a time that the second ranging request message was received at the access point.

9. The method of claim 1, wherein the device identifier of the first device is a media access control (MAC) address of the first device and wherein the device identifier of the second device is a MAC address of the second device.

10. The method of claim 1, further comprising broadcasting, by the access point, a second ranging response message after broadcasting the single ranging response message, wherein the second ranging response message indicates a time that the single ranging response message was broadcast on the channel by the access point.

11. An access point for use in a wireless local area network (WLAN), the access point comprising:

at least one processor; and
at least one memory coupled to the at least one processor, the at least one processor and the at least one memory being configured to direct the access point to:
receive a first ranging request message from a first device on a channel of the WLAN, wherein the first ranging request message includes a device identifier of the first device;
monitor the channel of the WLAN for a second ranging request message from a second device, wherein the second ranging request message includes a device identifier of the second device;
in response to receiving the second ranging request message from the second device during a response time period, combine the device identifier of the first device, first timing information associated with the first ranging request message, the device identifier of the second device, and second timing information associated with the second ranging request message into a single ranging response message, wherein the first and second timing information are for determining round trip time (RTT) measurements, by the first and second devices, respectively; and
in response to an end of the response time period, broadcast the single ranging response message on the channel of the WLAN.

12. The access point of claim 11, wherein the at least one processor and the at least one memory are further configured to direct the access point to:
begin the response time period in response to receiving the first ranging request message.

13. The access point of claim 12, wherein the at least one processor and the at least one memory are further configured to direct the access point to:
monitor the channel of the WLAN for one or more additional ranging request messages, including the second ranging request message, until the end of the response time period; and
in response to not receiving any additional ranging request messages, including the second ranging request message, generate the single ranging response message to include the device identifier only of the first device and the first timing information associated only with the first ranging request message.

14. The access point of claim 12, wherein the first ranging request message and the second ranging request message are broadcast ranging request messages broadcast on the channel of the WLAN by the first and second devices, respectively, and wherein the at least one processor and the at least one memory are further configured to direct the access point to randomize the response time period to reduce interference with other ranging response messages broadcast by other access points in the WLAN.

15. The access point of claim 12, wherein the response time period is variable, and wherein the at least one processor and the at least one memory are further configured to direct the access point to vary the response time period based on an activity level of the channel of the WLAN.

16. The access point of claim 15, wherein the at least one processor and the at least one memory are further configured to direct the access point to increase the response time period in response to the activity level of the channel being above an activity level threshold indicating a higher level of activity on the channel.

17. The access point of claim 11, wherein the first timing information comprises a time stamp indicating a time that the first ranging request message was received at the access point and wherein the second timing information comprises a time stamp indicating a time that the second ranging request message was received at the access point.

18. The access point of claim 11, wherein the device identifier of the first device is a media access control (MAC) address of the first device and wherein the device identifier of the second device is a MAC address of the second device.

19. The access point of claim 11, wherein the at least one processor and the at least one memory are further configured to direct the access point to broadcast a second ranging response message after broadcasting the single ranging response message, wherein the second ranging response message indicates a time that the single ranging response message was broadcast on the channel by the access point.

20. An access point for use in a wireless local area network (WLAN), the access point comprising:
means for receiving, by the access point, a first ranging request message from a first device on a channel of the WLAN, wherein the first ranging request message includes a device identifier of the first device;
means for monitoring, by the access point, the channel of the WLAN for a second ranging request message from a second device, wherein the second ranging request message includes a device identifier of the second device;
means for combining, by the access point, the device identifier of the first device, first timing information associated with the first ranging request message, the device identifier of the second device, and second timing information associated with the second ranging request message into a single ranging response message in response to receiving the second ranging request message from the second device during a response time period, wherein the first and second timing information are for determining round trip time (RTT) measurements, by the first and second devices, respectively; and
means for broadcasting, by the access point, the single ranging response message on the channel of the WLAN in response to an end of the response time period.

21. The access point of claim 20, further comprising:
means for beginning a response time period in response to receiving the first ranging request message.

22. A method performed by a device in a wireless local area network (WLAN), the method comprising:
transmitting, by the device, a first ranging request message on a channel of the WLAN, wherein the first ranging request message includes a device identifier of the device;
receiving, by the device, a first broadcast ranging response messages broadcast on the channel by a first access point of the WLAN in response to an end of a response time period, wherein the first broadcast ranging response message comprises:
the device identifier of the device,
first timing information associated with the first ranging request message,
a device identifier of a second device in the WLAN, and
second timing information associated with a second ranging request message transmitted on the channel of the WLAN by the second device; and
determining a round trip time (RTT) measurement for the first access point based on the first ranging request message and the first timing information included in the first broadcast ranging response messages.

23. The method of claim 22, wherein transmitting the first ranging request message on the channel of the WLAN comprises unicasting the first ranging request message to the first access point of the WLAN.

24. The method of claim 22, wherein the first timing information comprises a time stamp indicating a time that the first ranging request message was received at the first access point and wherein the second timing information comprises a time stamp indicating a time that the second ranging request message was received at the first access point.

25. The method of claim 22, wherein the device identifier of the device is a media access control (MAC) address of the device and wherein the device identifier of the second device is a MAC address of the second device.

26. The method of claim 22, further comprising receiving, at the device, a second ranging response messages transmitted by the first access point of the WLAN, wherein the second ranging response message indicates a time that the first broadcast ranging response message was broadcast on the channel by the first access point.

27. The method of claim 22, wherein transmitting the first ranging request message comprises broadcasting the first ranging request message on the channel of the WLAN, the method further comprising:
monitoring the channel of the WLAN for the first broadcast ranging response message broadcast on the channel by the first access point of the WLAN; and
monitoring the channel of the WLAN for one or more other first broadcast ranging response messages broadcast by a respective one or more other access points of the WLAN in response to the first ranging request message.

28. The method of claim 27, further comprising:
beginning a wait time period in response to broadcasting the first ranging request message on the channel of the WLAN, wherein the first broadcast ranging response message is received during the wait time period, and wherein monitoring the channel of the WLAN for the one or more other first broadcast ranging response messages comprises monitoring the channel for the one or more other first broadcast ranging response messages until an end of the wait time period.

29. The method of claim 28, wherein the wait time period is variable, the method further comprising varying the wait time period based on an activity level of the channel.

30. The method of claim 22, further comprising repeating the broadcasting, monitoring, and determining, for each of a plurality of channels of the WLAN.

* * * * *